(12) United States Patent
Chen

(10) Patent No.: US 11,099,889 B2
(45) Date of Patent: Aug. 24, 2021

(54) METHOD-CALL-CHAIN TRACKING METHOD, ELECTRONIC DEVICE, AND COMPUTER READABLE STORAGE MEDIUM

(71) Applicant: WANGSU SCIENCE & TECHNOLOGY CO., LTD., Shanghai (CN)

(72) Inventor: Qinglong Chen, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/981,267

(22) PCT Filed: Aug. 22, 2018

(86) PCT No.: PCT/CN2018/101752
§ 371 (c)(1),
(2) Date: Sep. 15, 2020

(87) PCT Pub. No.: WO2020/024343
PCT Pub. Date: Feb. 6, 2020

(65) Prior Publication Data
US 2021/0042150 A1    Feb. 11, 2021

(30) Foreign Application Priority Data
Jul. 30, 2018 (CN) .......................... 201810854255.2

(51) Int. Cl.
*G06F 3/00* (2006.01)
*G06F 9/48* (2006.01)

(52) U.S. Cl.
CPC .................. *G06F 9/4843* (2013.01)

(58) Field of Classification Search
CPC ...................................................... G06F 9/54
(Continued)

(56) References Cited

U.S. PATENT DOCUMENTS

| 8,271,996 B1* | 9/2012 | Gould | ..................... G06F 9/542 |
| | | | 719/312 |
| 2012/0050798 A1* | 3/2012 | Abe | ...................... G06F 3/1207 |
| | | | 358/1.15 |

(Continued)

FOREIGN PATENT DOCUMENTS

| CN | 106357463 A | 1/2017 |
| CN | 106502874 A | 3/2017 |

(Continued)

OTHER PUBLICATIONS

A Strategy to Manage Cache Consistency in a Disconnected Distributed Environment Anurag Kahol. (Year: 2001).*

(Continued)

*Primary Examiner* — Lechi Truong

(57) ABSTRACT

The present disclosure provides a method for tracking a method-call-chain. The method includes: setting a configuration item for whether to perform a method-call-chain tracking on a current application; intercepting before a method is called, and determining whether call chain information of the method needs to be outputted based on the configuration item; and when it is determined that the call chain information needs to be outputted, recording the call chain information of the method before executing a call request for the method, and outputting the recorded call chain information after the call request for the method is completed. The present disclosure further provides an electronic device and a computer readable storage medium. The method-call-chain tracking method, the electronic device, and the computer readable storage medium provided in the present disclosure allow the tracking of the method-call-chain without rewriting the codes by setting the configuration item and introducing a Spring-AOP.

17 Claims, 3 Drawing Sheets

(58) Field of Classification Search
USPC .......................................................... 719/328
See application file for complete search history.

(56) References Cited

U.S. PATENT DOCUMENTS

| | | | |
|---|---|---|---|
| 2014/0215444 A1* | 7/2014 | Voccio | G06F 11/3636 |
| | | | 717/128 |
| 2015/0309915 A1 | 10/2015 | Ajith Kumar et al. | |
| 2016/0232200 A1* | 8/2016 | Sherman | G06F 16/2379 |
| 2017/0097882 A1* | 4/2017 | Chakraborty | G06F 11/3684 |

FOREIGN PATENT DOCUMENTS

| | | |
|---|---|---|
| CN | 107870762 A | 4/2018 |
| CN | 108173915 A | 6/2018 |

OTHER PUBLICATIONS

The World Intellectual Property Organization (WIPO) International Search Report for PCT/CN2018/101752 dated Mar. 27, 2019 6 pages.

* cited by examiner

METHOD-CALL-CHAIN TRACKING METHOD, ELECTRONIC DEVICE, AND COMPUTER READABLE STORAGE MEDIUM

CROSS-REFERENCES TO RELATED APPLICATIONS

This application is a national phase entry under 35 U.S.C § 371 of International Application No. PCT/CN2018/101752, filed on Aug. 22, 2018, which claims priority of Chinese Patent Application No. 2018108542552, filed with the State Intellectual Property Office of P. R. China on Jul. 30, 2018, the entire contents of all of which are incorporated herein by reference.

FIELD OF THE DISCLOSURE

The present disclosure generally relates to the technical field of a method call and, more particularly, relates to a method for tracking a method-call-chain, an electronic device, and a computer readable storage medium.

BACKGROUND

A method (also known as a function), is a block of codes to implement certain specific functions. In a software implementation process, the implementation of a function is always performed by one or more methods. For example, if a user wants to log into a website, multiple methods such as user verification, password verification, and content loading of each module on a homepage are needed. In particular, some methods may be used in multiple places. For example, the password format verification method may be called when entering the payment password and the login password. Since a method may be called in multiple places, the entry of the call may be different, and the implemented functions and processing flow may be different as well. In addition, exception handling (such as an exception capture output log) needs to be performed during the implementation of the method call. If there is no output log of the entire call chain, it will be difficult to determine which business process or business branch has encountered an error.

The current method of implementing a method-call-chain is mainly by recording a call relationship at the beginning of the method implementation and outputting a call chain log after the process flow is completed. However, since the recording of the call method needs to be added in each method, a method to implement an interface or a method related to adding the call chain record in a method is needed, and for codes that have been developed, adding this function is equivalent to rewriting the codes, which has a high maintenance cost.

BRIEF SUMMARY OF THE DISCLOSURE

In view of the above, the present disclosure provides a method for tracking a method-call-chain, an electronic device, and a computer readable storage medium to solve one or more of the technical challenges above.

To achieve the purpose mentioned above, in one aspect, the present disclosure provides a method for tracking a method-call-chain. The method includes: setting a configuration item for whether to perform a method-call-chain tracking on a current application; intercepting before a method is called, and determining whether call chain information of the method needs to be outputted based on the configuration item; and when it is determined that the call chain information needs to be outputted, recording the call chain information of the method before executing a call request for the method, and outputting the recorded call chain information after the call request for the method is completed.

In one embodiment, a printMethodCallChain parameter in the configuration item may be used to control whether the call chain information needs to be outputted, when a parameter value is true, the call chain information may need to be outputted, and when the parameter value is false, the call chain information may not need to be outputted.

In one embodiment, intercepting before the method is called, and determining whether the call chain information of the method needs to be outputted based on the configuration item may include: when receiving the call request of the method, determining whether the call chain information needs to be outputted based on the configuration item when the call request of the method is received; when it is determined that the call chain information needs to be outputted, caching a request ID of the call request for the method; and intercepting before executing the call request of the method to determine whether the request ID is cached to determine whether the call chain information needs to be outputted.

In one embodiment, when it is determined that the call chain information needs to be outputted, recording the call chain information of the method before executing the call request for the method, and outputting the recorded call chain information after the call request for the method is completed may include: after determining the request ID is cached, recording the call chain information of the method and executing the call request of the method; after processing the call request of the method, determining whether the request ID is cached; and after determining the request ID is cached, outputting the recorded call chain information.

In one embodiment, the method may further include: removing the request ID from cache after outputting the recorded call chain information.

In one embodiment, the method may be intercepted by an aspect interception of a Spring-AOP framework.

To achieve the purpose mentioned above, in another aspect, the present disclosure provides an electronic device including a memory, a processor, and a method-call-chain tracking application that is stored in the memory and executable by the processor. When the method-call-chain tracking application being executed, the processor is configured to perform a method including: setting a configuration item for whether to perform a method-call-chain tracking on a current application; intercepting before a method is called, and determining whether call chain information of the method needs to be outputted based on the configuration item; and when it is determined that the call chain information needs to be outputted, recording the call chain information of the method before executing a call request for the method, and outputting the recorded call chain information after the call request for the method is completed.

In one embodiment, a printMethodCallChain parameter in the configuration item may be used to control whether the call chain information needs to be outputted. When a parameter value is true, the call chain information may need to be outputted, and when the parameter value is false, the call chain information may not need to be outputted.

In one embodiment, intercepting before the method is called, and determining whether the call chain information of the method needs to be outputted based on the configuration item may include: when receiving the call request of the method, determining whether the call chain information needs to be outputted based on the configuration item; when it is determined that the call chain information needs to be outputted, caching a request ID of the call request for the method; and intercepting before executing the call request for the method to determine whether the request ID is cached to determine whether the call chain information needs to be outputted.

In one embodiment, when it is determined that the call chain information needs to be outputted, recording the call chain information of the method before executing the call request for the method, and outputting the recorded call chain information after the call request for the method is completed may include: after determining the request ID is cached, recording the call chain information of the method and executing the call request for the method; after processing the call request for the method, determining whether the request ID is cached; and after determining the request ID is cached, outputting the recorded call chain information.

In one embodiment, when the method-call-chain tracking application being executed, the processor may be further configured for: removing the request ID from cache after outputting the recorded call chain information.

In one embodiment, the method may be intercepted by an aspect interception of a Spring-AOP framework.

To achieve the purpose mentioned above, in another aspect, the present disclosure provides a computer readable storage medium for storing a method-call-chain tracking application that may be executable by one or more processors such that the one or more processors are configured to perform the method-call-chain tracking method described above.

Compare to the existing technologies, the method for tracking a method-call-chain, the electronic device, and the computer readable storage medium provided in the present disclosure allow the method-call-chain to be tracked without the need to rewrite the codes by setting the configuration items and introducing the Spring-AOP framework. When the processing logic of the request is complicated and multi-branched, the business logic may be quickly located based on the call chain information, and the problem may be quickly located when the request is processed abnormally.

BRIEF DESCRIPTION OF THE DRAWINGS

To more clearly illustrate the technical solutions of the present disclosure, the accompanying drawings to be used in the description of the disclosed embodiments are briefly described hereinafter. Obviously, the drawings described below are merely some embodiments of the present disclosure. Other drawings derived from such drawings may be obtained by a person having ordinary skill in the art without creative labor.

Reference will now be made in detail to exemplary embodiments of the disclosure, which are illustrated in the accompanying drawings.

DETAILED DESCRIPTION

To make the objectives, technical solutions, and advantages of the present disclosure clearer, the following further describes the embodiments of the present disclosure in detail with reference to the accompanying drawings. It should be understood that the specific embodiments described herein are merely used to explain the present disclosure and are not intended to limit the present disclosure. Based on the embodiments of the present disclosure, all other embodiments of ordinary skill in the art without any creative effort shall fall within the scope of the present disclosure.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the scope of protection required by the present disclosure.

Embodiment 1

Figure 1:
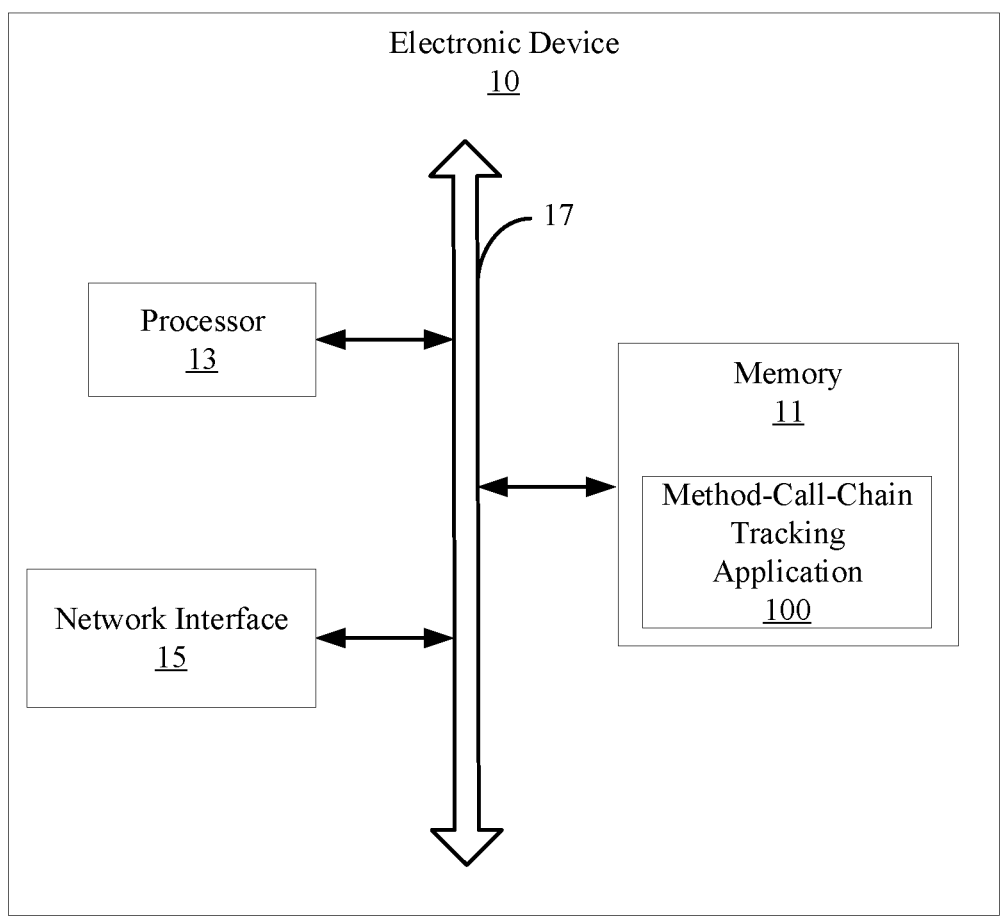
FIG. 1 illustrates a schematic structural diagram of an electronic device according to a first embodiment of the present disclosure.

Referring to FIG. 1, the first embodiment of the present disclosure provides an electronic device 1 to implement a method-call-chain tracking method.

In the present disclosure, the electronic device 1 may be a server, a smart phone, a tablet, a personal computer, a portable computer, and other electronic devices having computing functions.

The electronic device 1 includes a memory 11, a processor 13, a network interface 15, and a communication bus 17, where the network interface 15 may optionally include a standard wired interface and a wireless interface (such as a Wi-Fi interface). The communication bus 17 may be used to bridge the communication between these components.

The memory 11 may include one or more types of readable storage medium, where the one or more types of readable storage medium may be a non-transitory storage medium such as a flash memory, a hard disk, a multimedia card, a card type memory, or the like. In some embodiments, the memory 11 may be an internal storage unit of the electronic device 1, such as a hard disk of the electronic device 1. In other embodiments, the memory 11 may also be an external storage unit of the electronic device 1, such as a plug-in hard disk installed in the electronic device 1, a Smart Media Card (SMC), a Secure Digital (SD) card, a flash card, etc.

The memory 11 may be used to store application software installed on the electronic device 1 and various types of data, such as the application codes of the method-call-chain tracking application 10 and the related data generated during the operation thereof.

In some embodiments, the processor 13 may be a central processing unit, a microprocessor, or other data processing chip to execute the application codes or the processing data stored in the memory 11.

FIG. 1 only illustrates the electronic device 11 having components 11-17 and the method-call-chain tracking application 10, but it should be understood that FIG. 1 does not show all the components of the electronic device 1, as it may be implemented with more or fewer components instead.

In the embodiment of the electronic device 1 shown in FIG. 1, the memory 11 of the computer storage medium stores the application codes of the method-call-chain tracking application 10, and when the processor 13 executes the application codes of the method-call-chain tracking application 10, the following method may be implemented:

Setting a configuration item for whether to perform the method-call-chain tracking on a current application;

Intercepting before a method is called, and determining whether a call chain information of the method needs to be outputted based on the configuration item; and When it is determined that the call chain information needs to be outputted, recording the call chain information of the method before executing a call request for the method, and outputting the recorded call chain information after the call request for the method is completed.

The details of the above method are provided in the following second and third embodiments, and will not be described herein again.

Embodiment 2

Figure 2:
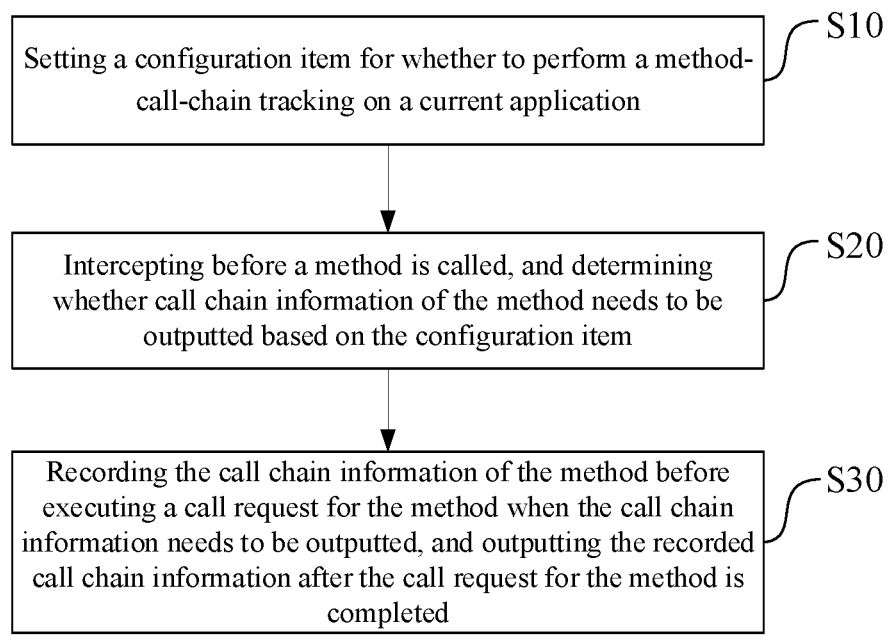
FIG. 2 illustrates a schematic flowchart of a method-call-chain tracking method according to a second embodiment of the present disclosure.

Referring to FIG. 2, the second embodiment of the present disclosure provides a method-call-chain tracking method. In the present embodiment, the order to the execution of the steps in the flowchart in FIG. 2 may be changed based on different needs, further, some of the steps may be omitted.

S10: setting a configuration item for whether to perform the method-call-chain tracking on a current application.

The configuration item may be used to customize the control of whether to perform the method-call-chain tracking, that is, whether to output (e.g., print) the method-call-chain information. By setting a printMethodCallChain parameter in the configuration item, it may be possible to control whether the printing of the method-call-chain information need to be enabled for different applications. In particular, when the value of the parameter is true, the configuration item may be enabled and the method-call-chain information may be printed; when the value of the parameter is false, the configuration item may be disabled and the method-call-chain information may not be printed. Once the configuration item is enabled, when a corresponding request is received, the request may be marked with the need to print the call chain information, and the corresponding method-call-chain information may be recorded before each method is called.

S20: intercepting before a method is called and determining whether call chain information of the method needs to be outputted based on the configuration item.

A Spring-AOP (Aspect Oriented Programming) framework may be used to configure the methods, classes, and packages that need to be intercepted in a configuration file. Through an aspect intercept of the Spring-AOP, the method code block that needs to be intercepted may be intercepted and whether the call chain information of the current request needs to be printed may be determined. Using the Spring-AOP interception method, the code blocks that are already developed do not need to be modified, and the tracking of the method-call-chain may be implemented without rewriting the codes.

S30: when it is determined that the call chain information needs to be outputted, recording the call chain information of the method before executing a call request for the method, and outputting the recorded call chain information after the call request for the method is completed.

More specifically, once the method is intercepted, if it is determined that the call chain information needs to be printed, the call chain information of the method currently called may be recorded before the method call request is executed, then the method call request may be executed, and the recorded call chain information may be outputted after the method call request is completed. Further, if it is determined that the call chain information does not need to be printed, step S30 may be skipped and the interception method may continue to be executed.

For a detailed description of steps S20 and S30, please refer to the relevant steps in FIG. 3 and the third embodiment provided below.

Embodiment 3

Figure 3:
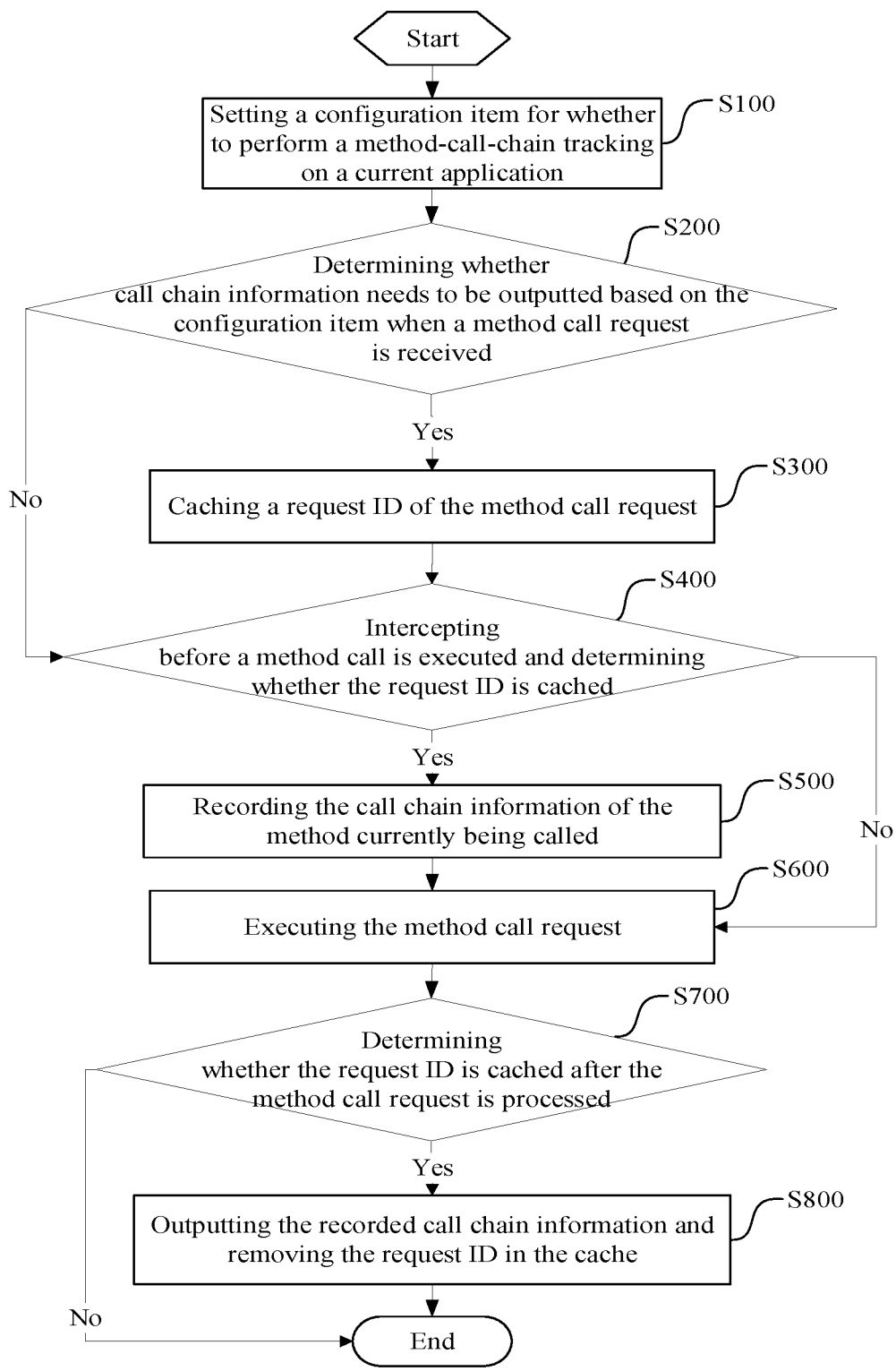
FIG. 3 illustrates a schematic flowchart the method-call-chain tracking method according to a third embodiment of the present disclosure.

As shown in FIG. 3, the third embodiment of the present disclosure provides a method-call-chain tracking method. In the present embodiment, the order to the execution of the steps in the flowchart in FIG. 3 may be changed based on different needs, further, some of the steps may be omitted.

Step S100: setting a configuration item for whether to perform the method-call-chain tracking on a current application.

The configuration item may be used customize the control of whether to perform the method-call-chain tracking, that is, whether to output (print) the method-call-chain information. By setting a printMethodCallChain parameter in the configuration item, whether the printing of the method-call-chain information needs to be enabled for different applications is controlled. In particular, when the value of the parameter is true, the configuration item may be enabled and the method-call-chain information may be printed; when the value of the parameter is false, the configuration item may be disabled and the method-call-chain information may not be printed. Once the configuration item is enabled, when a corresponding request is received, the request may be marked with the need to print the call chain information, and the corresponding method-call-chain information may be recorded before each method call.

Step S200: determining whether the call chain information needs to be outputted based on the configuration item when the call request for the method is received. If the call chain information needs to be outputted, Step S300 may be executed. When the call chain information does not need to be outputted, Step S400 may be executed.

In particular, the need to output the call chain information may be determined based on the parameter value of the configuration item when the current application receives the method call request. That is, when the parameter value of the printMethodCallChain of the configuration item is true, it may be determined that the method-call-chain information needs to be outputted; and when the parameter value of the printMethodCallChain of the configuration item is false, it may be determined that the method-call-chain information does not need to be outputted.

Step S300: caching a request ID of the method call request, then executing Step S400.

Once it is determined that the method-call-chain information needs to be outputted based on the configuration item, the request ID of the method call may be cached, and the call chain information may be recorded when the method call is executed subsequently.

Step S400: intercepting before a method call is executed and determining whether the request ID is cached. If the request is cached, execute Step S500, and if the request ID is not cached, execute Step S600.

The Spring-AOP framework may be introduced to the current application to configure the methods, classes, and packages that need to be intercepted in the configuration file. Through the aspect intercept of the Spring-AOP, the method code block that needs to be intercepted may be intercepted and whether the need to output the call chain information of the method may be determined by determining whether the request ID is cached in the memory.

Step S500: recording the call chain information of the method currently being called, then execute Step S600.

Once it is determined that the request ID is cached, the call chain information of the method may need to be outputted, the call chain information of the method currently being called may need to be recorded before the method call request is executed, and then the method call request may be executed. In the present embodiment, the name of the corresponding method is cached in the queue corresponding to the cached request ID.

Step S600: executing the method call request.

Once it is determined that the request ID is not cached, or the call chain information of the method has been recorded, the intercepted method call request may continue to be executed.

Step S700: determining whether the request ID is cached after the method call request is processed. If the request ID is cached, Step S800 is executed, and if the request ID is not cached, the process is ended.

Once the method call request process is completed, whether the call chain information of the method needs to be outputted may be determined by whether the request ID is cached. If the request ID is in the cache, the call chain information of the method may need to be outputted; and if the request ID is not in the cache, the call chain information of the method may not need to be outputted.

Step S800: outputting the recorded call chain information and removing the request ID in the cache.

More specifically, once it is determined that the call chain information of the method needs to be outputted, the data in the queue corresponding to the request ID may be sequentially printed, and the entire data queue outputted may be the call sequence (call chain) of the method. At the same time, the request ID may be removed from the cache.

The method-call-chain tracking method provided in the present embodiment allows the method-call-chain to be tracked without the need to rewrite the codes by setting the configuration item and introducing the Spring-AOP framework. When the processing logic of the request is complex and multi-branched, the business logic may be quickly located based on the call chain information, and the problem may be quickly located when the request is processed abnormally, so it may not take too much time to analyze the code logic but fail to locate the problem.

Embodiment 4

The present disclosure further provides another embodiment, that is, a computer readable storage medium for storing the method-call-chain tracking application 10, where the method-call-chain tracking application 10 may be executed by one or more processors, and the one or more processors may execute the method-call-chain tracking method as described above.

Based on the descriptions of the above implementations, those skilled in the art can understand that the method according to the above embodiment may be implemented by software and a general hardware platform which is necessary, or by hardware. In most situations, the former is a preferred implementation. Based on this understanding, the essence of the technical solutions or the part of the technical solutions which contributes to the conventional technology, of the present disclosure may be implemented in a form of software product, which is stored in a storage medium (such as a ROM/RAM, a magnetic disk or an optical disk) and includes several instructions to control a terminal device (which may be a mobile phone, a computer, a server or a network device, etc.) to execute the method according to the embodiments of the present disclosure.

The above descriptions disclose the embodiments of the present invention, but do not limit the scope of the invention. Thus, it is intended that the present invention cover modifications and variations that come within the scope of the appended claims and their equivalents, as well as direct or indirect applications of the embodiments in other related technical fields.

What is claimed is:

1. A method-call-chain tracking method, comprising: setting a configuration item for whether to perform a method-call-chain tracking on a current application for call chain information on a method being called under a call sequence; intercepting each time before the method is called, and determining whether the call chain information of the method needs to be outputted based on the configuration item; and when it is determined that the call chain information needs to be outputted, recording the call chain information of the method before executing a call request for the method, and outputting the recorded call chain information after the call request, for the method is completed, wherein, recording the call chain information of the method comprising caching a name of the method in a queue corresponding to a request ID of the call request for the method; and outputting the recorded call chain information comprising printing data in the queue corresponding to the request ID sequentially;
wherein a printMethodCallChain parameter in the configuration item is used to control whether the call chain information needs to be outputted, when a parameter value is true, the call chain information needs to be outputted, and wherein the parameter value is false, the call chain information does not need to be outputted.

2. The method-call-chain tracking method according to claim 1, wherein intercepting before the method is called, and determining whether the call chain information of the method needs to be outputted based on the configuration item include: when receiving the call request of the method, determining whether the call chain information needs to be outputted based on the configuration item; when it is determined that the call chain information needs to be outputted, caching the request ID of the call request for the method; and intercepting before executing the call request of the method to determine whether the request ID is cached to determine whether the call chain information needs to be outputted.

3. The method-call-chain tracking method according to claim 2, wherein, when it is determined that the call chain information needs to be outputted, recording the call chain information of the method before executing the call request for the method, and outputting the recorded call chain information after the call request for the method is completed include: after determining the request ID is cached, recording the call chain information of the method and executing the call request of the method; after processing the call request of the method, determining whether the request ID is cached; and after determining the request ID is cached, outputting the recorded call chain information.

4. The method-call-chain tracking method according to claim 3, further comprising: removing the request ID from cache after outputting the recorded call chain information.

5. The method-call-chain tracking method according to claim 1, wherein the method is intercepted by an aspect interception of a Spring-AOP framework.

6. The method-call-chain tracking method according to claim 5, wherein, by using the aspect interception of the Spring-AOP framework, a method code block that needs to be intercepted is intercepted, and method code blocks that are already developed do not need to be modified and the method-call-chain is tracked without rewriting method codes.

7. An electronic device, including a memory, a processor, and a method-call-chain tracking application that is stored in the memory and executable by the processor, wherein when the method-call-chain tracking application being executed, the processor is configured to perform: setting a configuration item for whether to perform a method-call-chain tracking on a current application for call chain information on a method being called under a call sequence; intercepting each time before the method is called, and determining whether the call chain information of the method needs to be outputted based on the configuration item; and when it is determined that the call chain information needs to be outputted, recording the call chain information of the method before executing a call request for the method, and outputting the recorded call chain information after the call request for the method is completed, wherein, recording the call chain information of the method comprising caching a name of the method in a queue corresponding to a request ID of the call request for the method; and outputting the recorded call chain information comprising printing data in the queue corresponding to the request ID sequentially;
wherein a printMethodCallChain parameter in the configuration item is used to control whether the call chain information needs to be outputted, when a parameter value is true, the call chain information needs to be outputted, and when the parameter value is false, the call chain information does not need to be outputted.

8. The electronic device according to claim 7, wherein intercepting before the method is called, and determining whether the call chain information of the method needs to be outputted based on the configuration item include: when receiving the call request of the method, determining whether the call chain information needs to be outputted based on the configuration item; when it is determined that the call chain information needs to be outputted, caching the request ID of the call request for the method; and intercepting before executing the call request of the method to determine whether the request ID is cached to determine whether the call chain information needs to be outputted.

9. The electronic device according to claim 8, wherein, when it is determined that the call chain information needs to be outputted, recording the call chain information of the method before executing the call request for the method, and outputting the recorded call chain information after the call request for the method is completed include: after determining the request ID is cached, recording the call chain information of the method and executing the call request of the method; after processing the call request for the method, determining whether the request ID is cached; and after determining the request ID is cached, outputting the recorded call chain information.

10. The electronic device according to claim 9, wherein when the method-call-chain tracking application being executed, the processor is further configured for: removing the request ID from cache after outputting the recorded call chain information.

11. The electronic device according to claim 7, wherein the method is intercepted by an aspect interception of a Spring-AOP framework.

12. A non-transitory computer readable storage medium, wherein the computer readable storage medium stores a method-call-chain tracking application that is executable by one or more processors such that the one or more processors are configured to perform a method-call-chain tracking, method, the method-call-chain tracking method comprising: setting a configuration item for whether to perform a method-call-chain tracking on a current application for call chain information on a method being called under a call sequence; intercepting each time before the method is called, and determining whether the call chain information of the method needs to be outputted based on the configuration item; and when it is determined that the call chain information needs to be outputted, recording the call chain information of the method before executing a call request for the method, and outputting the recorded call chain information after the call request for the method is completed, wherein, recording the call chain information of the method comprising caching a name of the method in a queue corresponding to a request ID of the call request for the method; and outputting the recorded call chain information comprising printing data in the queue corresponding to the request ID sequentially,
wherein a printMethodCallChain parameter in the configuration item is used to control whether the call chain information needs to be outputted, when a parameter value is true, the call chain information needs to be outputted, and when the parameter value is false, the call chain information does not need to be outputted.

13. The storage medium according to claim 12, wherein intercepting before the method is called, and determining whether the call chain information of the method needs to be outputted based on the configuration item include: when receiving the call request of the method, determining whether the call chain information needs to be outputted based on the configuration item; when it is determined that the call chain information needs to be outputted, caching the request ID of the call request for the method; and intercepting before executing the call request of the method to determine whether the request ID is cached to determine whether the call chain information needs to be outputted.

14. The storage medium according to claim 13, wherein, when it is determined that the call chain information needs to be outputted, recording the call chain information of the method before executing the call request for the method, and outputting the recorded call chain information after the call request for the method is completed include: after determining the request ID is cached, recording the call chain information of the method and executing the call request of the method; after processing the call request of the method, determining whether the request ID is cached; and after determining the request ID is cached, outputting the recorded call chain information.

15. The storage medium according to claim 14, wherein the method-call-chain tracking method further includes: removing the request ID from cache after outputting the recorded call chain information.

16. The storage medium according to claim 12, wherein the method is intercepted by an aspect interception of a Spring-AOP framework.

17. The storage medium according to claim 16, wherein, by using the aspect interception al the Spring-AOP framework, a method code block that needs to be intercepted is intercepted, and method code blocks that are already developed do not need to be modified and the method-call-chain is tracked without rewriting method codes.

* * * * *